United States Patent [19]

Scherer et al.

[11] 4,371,735
[45] Feb. 1, 1983

[54] PREPARATION OF PIGMENTS HAVING IMPROVED TECHNOLOGICAL PROPERTIES

[75] Inventors: Hans Scherer, Weisenheim; Wolfgang Lotsch, Beindersheim; Gustav Bock, Neustadt, all of Fed. Rep. of Germany

[73] Assignee: BASF Aktiengesellschaft, Rheinland-Pfalz, Fed. Rep. of Germany

[21] Appl. No.: 157,168

[22] Filed: Jun. 6, 1980

Related U.S. Application Data

[63] Continuation of Ser. No. 971,061, Dec. 19, 1978, abandoned.

[30] Foreign Application Priority Data

Dec. 24, 1977 [DE] Fed. Rep. of Germany ....... 2757982

[51] Int. Cl.$^3$ .............................................. C09B 57/04
[52] U.S. Cl. .................................. 544/300; 106/288 Q
[58] Field of Search ......................................... 544/300

[56] References Cited

U.S. PATENT DOCUMENTS 3,646,033   2/1972   Leister et al. .................... 544/300
4,166,179   8/1979   Lotsch ............................. 544/296

*Primary Examiner*—Paul M. Coughlan, Jr.
*Attorney, Agent, or Firm*—Oblon, Fisher, Spivak, McClelland & Maier

[57] ABSTRACT

A process for the preparation of an easily dispersible pigment, of high tinctorial strength, having the formula

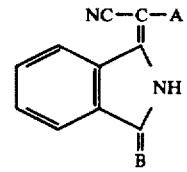

where A is cyano, carbonamido, N-phenyl or N-(chlorophenyl)-carbonamido or is a 5-membered or 6-membered unsaturated heterocyclic ring fused to a benzene ring and B is a barbituric acid radical, by condensing 1-amino-3-imino-insoindoline with the appropriate cyanomethylene compound at pH>7 and then with barbituric acid at pH 1.5-3.5, in an aqueous medium or in water, at from 20° to 150 C. The process may be used to produce high-hiding or transparent pigments which give brilliant colorations.

18 Claims, No Drawings

PREPARATION OF PIGMENTS HAVING IMPROVED TECHNOLOGICAL PROPERTIES

This is a continuation of application Ser. No. 971,061 filed Dec. 19, 1978, now abandoned.

The present invention relates to a process for the preparation of easily dispersible pigments, of high tinctorial strength, based on isoindoline.

Compounds of the formula

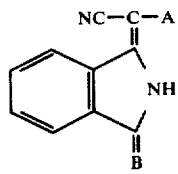

where A and B inter alia have the meanings given later, and their preparation, are disclosed in German Laid-Open Application DOS 1,670,748. According to page 9 of this DOS, the reaction which gives the monocondensation product (ie. the 1st stage) is carried out in a lower alkanol, glycol, glycol monoether, diglycol monoether or lower carboxylic acid amide as the reaction medium. In the case of readily water-soluble 1-amino-3-imino-isoindolines, water or an alcohol-water mixture can allegedly be used as the reaction medium. In these reactions, the addition of an ammonia-binding agent can be advantageous, especially if the starting component contains groups which react with ammonia.

The condensation of the monocondensation product to give the bis-condensation product (ie. the 2nd stage) is preferably carried out in a relatively high boiling solvent.

Using the prior art process, the condensation products of the formula I are obtained in only moderate yield and in a form which is ill-suited for use as a pigment, especially for use in coloring plastics and surface coatings in pure or almost pure shades.

The pigments thus obtained are difficult to disperse in plastics and accordingly give pale colorations. Furthermore, surface coatings which contain the prior art pigment are insufficiently lightfast and fast to weathering.

As will be appreciated from the Examples which follow, the present invention provides a process for the preparation of pigments of the formula I which have high tinctorial strength and in particular are easily dispersible in plastics, the process being one which entails less pollution of the effluent by solvents.

According to the invention, a pigment, having improved technological properties, of the formula

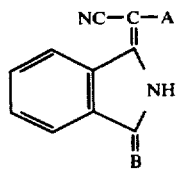

where A is cyano, carbamoyl, N-phenylcarbamoyl, N-(chlorophenyl)-carbamoyl or an unsaturated heterocyclic 5-membered or 6-membered radical fused to a benzene ring, and B is a barbituric acid radical, is obtained by condensing 1-amino-3-imino-isoindoline with the appropriate cyanomethylene compound at pH >7 and then with barbituric acid at pH 1.5-3.5 in a liquid reaction medium at from 20° to 150° C., if the condensation is carried out in the presence of water, or in water.

Examples of 5-membered or 6-membered heterocyclic radicals fused to a benzene ring are benzimidazol-2-yl and preferably quinazol-2-yl.

Examples of barbituric acid radicals B are those of N-methylbarbituric acid, N-phenylbarbituric acid, 2-thiobarbituric acid, 2-iminobarbituric acid, 2-N-cyanoiminobarbituric acid and unsubstituted barbituric acid, as well as radicals derived from mixtures of the said barbituric acids. Preferably, B is the (unsubstituted) barbituric acid radical.

The process according to the invention gives the pigments of the formula I directly in an easily dispersible pigmentary form of high tinctorial strength. Depending on how the reaction is carried out in the 2nd stage, either transparent or highly scattering (ie. high-hiding) pigmentary forms of I can be prepared. In plastics, especially in thermoplastics, eg. rigid PVC, polyethylene, polypropylene, polystyrene, polyacrylate, polymethacrylate, copolymers of styrene, acrylonitrile, butadiene and/or acrylic acid esters, and plasticized PVC, the products give lightfast, brilliant and deep colorations. In surface coatings, they give deep and brilliant colorations which are lightfast in the case of pure or almost pure shades.

The process according to the invention can be carried out by first reacting 1-amino-3-imino-isoindoline, prepared in the conventional manner, with an equimolar amount of the cyanomethylene compound

at pH >7 (stage 1). The resulting monocondensation product of stage 1 is then condensed further with an equimolar amount of barbituric acid, at pH 1.5–3.5, to give the pigment I (stage 2).

The process can be carried out by first isolating the product of stage 1 and only then carrying out the further condensation. Advantageously, however, the condensations comprising the 1st and 2nd stage are carried out in the same reaction vessel (and in the same reaction medium). In that case, after completion of the monocondensation the pH of the reaction medium is brought to 1.5–3.5 by adding acid.

Reaction media for the process of the invention are especially water and mixtures of water with organic water-miscible solvents.

Examples of solvent are the $C_1$–$C_4$-alkanols, i.e., methanol, ethanol, isopropanol, n-propanol, n-butanol, isobutanol and tert.-butanol, $C_2$–$C_4$-alkanediols, ie. ethylene glycol, 1,2- and 1,3-propylene glycol and the butanediols, glycol monoalkyl ethers, eg. the monomethyl, monoethyl, monopropyl and monobutyl ethers of ethylene glycol and of diethylene glycol, lower carboxylic acid amides, eg. dimethylformamide, dimethylacetamide and dimethylpropionamide, and cyclic amides, eg. N-methylpyrrolidone.

The preferred reaction media are water and a mixture of water and ethylene glycol.

The condensation in stage 1 occurs smoothly at pH >7 and a temperature of from 20° to 100° C., preferably from 40° to 80° C., after having added the compound II.

It gives the monocondensation product, of the formula

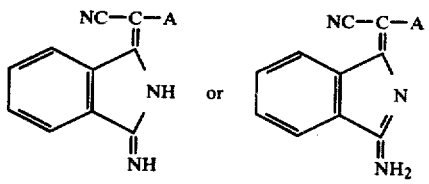

in the pure form, ie. extremely little, if any, bis-condensation product is formed under the reaction conditions.

Advantageously, the reaction mixture is then brought to a pH of from 1.5 to 3.5 by adding an acid either before or after adding the barbituric acid. The further condensation to give compound I conveniently takes place at from 20° to 150° C., preferably from 40° to 100° C.

The amount of added acid can be selected so that the ammonia liberated during the reaction is chemically bonded and hence neutralized, and therefore the pH remains at from 1.5 to 3.5. Preferably, the condensation in stage 2 is carried out by keeping the pH in the reaction mixture within the desired range by adding acid in portions or continuously. In this way, the condensation in stage 2 can be carried out within a narrow pH range.

Examples of acids for the above pH adjustment are aliphatic and aromatic carboxylic acids and/or sulfonic acids. Specific examples are formic acid, acetic acid, propionic acid, oxalic acid, succinic acid, glutaric acid, citric acid, benzoic acid, phthalic acid, salicylic acid, benzenesulfonic acid, toluenesulfonic acid, naphthalenesulfonic acid, phenolsulfonic acid and mixtures of these. Further acids are mineral acids, eg. hydrochloric acid, sulfuric acid, phosphoric acid, sulfurous acid or mixtures of these. Mixtures of both the first- and second-listed can, of course, be used.

Since the condensations in stages 1 and 2 are specific reactions, the process can also be carried out by initially preparing a mixture of the cyanomethylene compound (II) and of the barbituric acid, both components being used in an amount equimolar to the 1-amino-3-iminoisoindoline employed and then carrying out the condensation of stage 1, followed by the condensation of stage 2, in the manner described above.

Using this embodiment of the process, which is advantageous if the process is carried out industrially, the product is obtained in the same advantageous pigmentary form as when the reactants are added immediately prior to carrying out the reaction stage in which they are required.

The condensation can be carried out in the presence or absence of a surfactant. Since pigmentary forms of high tinctorial strength, which are particularly easily dispersible, are obtained in the latter case, the condensation is preferably carried out in the presence of a surfactant. The latter can be added either when carrying out the condensation of stage 1, or before or after the condensation of stage 2. The amount of the surfactant or surfactants employed is not critical above a certain minimum amount, and can therefore be varied within wide limits. The lower limit is about 5% by weight, based on $BH_2$. Advantageously, the amount used is from 5 to 400 percent by weight, preferably from 10 to 100 percent by weight, based on the amount of $BH_2$ employed.

The surfactant may, for example, be one of the nonionic, anionic and cationic compounds (conventionally used as dispersants or wetting agents) or protective colloids and mentioned below: anionic surfactants: $C_4$–$C_{20}$-alkylbenzenesulfonic acids, $C_4$–$C_{20}$-alkylphenolsulfonic acids, mono- and bis-$C_1$–$C_{10}$-alkylnaphthalenesulfonic acids, partially sulfonated polystyrene, water-soluble condensation products of β-naphthalenesulfonic acid or $C_1$–$C_{10}$-alkylnaphthalene-β-sulfonic acids and formaldehyde, condensation products of phenolsulfonic acids, formaldehyde and urea, condensation products of phenol, urea and formaldehyde, condensation products of phenol, formaldehyde, urea and sodium sulfite, phenol-formaldehyde condensation products which have been postcondensed with phenolsulfonic acid, urea and formaldehyde, ligninsulfonates, long-chain fatty acids (of 12 to 20 carbon atoms) and resin acids, in the form of the alkali metal salts, alkaline earth metal salts or ammonium salts, or mixtures of these surfactants; nonionic surfactants: adducts of ethylene oxide, or of propylene oxide, or of ethylene oxide and propylene oxide, with alkanols, alkanediols, alkanepolyols, where the alkane radical is of 2 to 20 carbon atoms, phenols, carboxylic acids, carboxylic acid amides and aliphatic cycloaliphatic and aromatic monoamines, diamines and polyamines.

Further surfactants are water-swellable or water-soluble polymers, eg. polymers of vinylpyridine or N-vinylpyrrolidone, and copolymers of water-soluble monomers, eg. N-vinylpyrrolidine, acrylamide and/or acrylic acid, with water-insoluble monomers, eg. acrylonitrile, methacrylic acid esters, acrylic acid esters, vinyl acetate, vinyl chloride and/or styrene, and also polyvinyl alcohol, $C_{10}$–$C_{20}$-fatty alcohols and condensation products of isobutyraldehyde, formaldehyde and urea. Mixtures of surfactants can also be used.

Preferred surfactants are $C_1$–$C_5$-alkylnaphthalenesulfonic acids, $C_{10}$–$C_{20}$-fatty alcohols, condensation products of phenol, urea and formaldehyde, adducts of ethylene oxide, or of ethylene oxide and propylene oxide, with $C_2$–$C_{20}$-alkanols, $C_2$–$C_{20}$-alkanediols, $C_3$–$C_{10}$-alkanetriols, aliphatic $C_{10}$–$C_{20}$-carboxylic acids and $C_{10}$–$C_{20}$-carboxylic acid amides, and condensation products of isobutyraldehyde, formaldehyde and urea, as well as mixtures of these products.

By a suitable choice of the conditions for the reaction of the monocondensation product of the formula III, where A is —$CONH_2$, with a barbituric acid, the reaction can be controlled so that either a reddish transparent or high-hiding pigmentary form, or a greenish transparent or high-hiding pigmentary form is obtained. The latter is distinguished by particularly good lightfastness and fastness to weathering.

The reddish transparent pigmentary form is obtained if the condensation of stage 2 is carried out at pH 2.5–3.5 and at from 60° to 90° C.

The greenish transparent pigmentary form is obtained if the condensation of stage 2 is carried out at pH 1.5–2.5 and at from 60° to 90° C.

High-hiding reddish or greenish pigmentary forms with substantially better lightfastness and fastness to weathering than the colorant of German Laid-Open Application DOS 1,670,748 are obtained if the condensation of stage 2 is carried out under the above conditions and, in order to complete the condensation, or after completion of the condensation, the reaction mixture is heated at 110°–140° C. under pressure.

The Examples which follow illustrate the process according to the invention. In the Examples, parts and percentages are by the weight.

EXAMPLE 1

64 parts of o-phthalodinitrile are suspended in 400 parts of ethylene glycol and treated with 15 parts of ammonia gas in 3 hours at 60° C. The resulting solution of 1-amino-3-iminoisoindoline is run into a suspension, brought to pH 9 and heated to 60° C., of 64 parts of barbituric acid and 42 parts of cyanoacetamide in 750 parts of water, and the mixture is then stirred for a further 2 hours at 60° C. Thereafter it is acidified to pH 3 with sulfuric acid and stirred for 2 hours at pH 3 and 60° C. 16 parts of oleic acid ethanolamide are then added, the mixture is heated to 90° C. and the product is filtered off and dried. 150 parts of a neutral yellow pigment having a high tinctorial strength and good dispersibility in plastics are obtained.

EXAMPLE 2

135 parts of about 25% strength aqueous ammonia and 62.2 parts of ethyl cyanoacetate are stirred for two hours at room temperature and the mixture is then diluted with 750 parts of water. 64 parts of barbituric acid are introduced and the batch is heated to 60° C., the pH assuming a value of about 9. The solution of 1-amino-3-iminoisoindoline, prepared as described in Example 1, is run into this suspension and the batch is stirred for two hours. 40 parts of the sodium salt of a $C_3$–$C_4$-alkylnaphthalenesulfonic acid are then added and the mixture is acidified to pH 3 and stirred for two hours at 60° C. and three hours at 130° C. After it has cooled, the product is filtered off, washed and dried. 29 parts of a lightfast and relatively high-hiding yellow pigment having a very high tinctorial strength and good dispersibility are obtained.

EXAMPLE 3

42 parts of cyanoacetamide and 15 parts of a $C_{10}$–$C_{20}$-fatty alcohol mixture are introduced into a solution, at 60° C., of 1-amino-3-iminoisoindoline, prepared as described in Example 1 from 64 parts of o-phthalodinitrile in 400 parts of ethylene glycol, and the mixture is diluted with 300 parts of isobutanol and stirred for a further two hours at 60° C. The resulting suspension of the monocondensation product is acidified to pH 2 with sulfuric acid, and 64 parts of barbituric acid and sufficient water to keep the reaction mixture stirrable are then added. Stirring is continued at pH 2 and 60° C. for two hours, the pH is then raised to 6–7 and further water is added, the isobutanol is distilled off completely, the residue is filtered and the product is dried. 149 parts of a brilliant relatively high-hiding greenish yellow pigment, having a high tinctorial strength, good lightfastness and good dispersibility, are obtained.

EXAMPLE 4

The procedure described in Example 2 is followed, but instead of a solution of 1-amino-3-iminoisoindoline prepared as described in Example 1, a solution is used which has been prepared from solid 1-amino-3-iminoisoindoline, or an equimolar amount of a solid adduct thereof, for example with ethylene glycol (German Patent 879,100, Example 25) or an equimolar amount of a solid salt of 1-amino-2-iminoisoindoline and a mineral acid or carboxylic acid. Condensation (1st stage) takes place at pH approx. 9. 115 parts of a lightfast, relatively high-hiding, neutral yellow pigment having a high tinctorial strength and good dispersibility are obtained.

EXAMPLE 5

The procedure described in Example 3 is followed, but after distilling off the isobutanol the reaction mixture is heated for a further 10 hours at 130° C. 130 parts of a high-hiding, brilliant, greenish yellow pigment are obtained, the pigment having good fastness to weathering when used to color surface coatings in almost full shades.

EXAMPLE 6

The procedure described in Example 1 is followed, except that 100 parts of formic acid are used for acidification. 150 parts of a neutral yellow pigment having a high tinctorial strength and good dispersibility in plastics are obtained.

EXAMPLE 7

The procedure followed is as described in Example 1, but before acidification to pH 3, 16 parts of a condensation product of phenolsulfonic acid, formaldehyde and urea are added to the reaction mixture, and the batch is then stirred for 2 hours at 60° C. and thereafter at pH 6–7 and 130° C. for 14 hours. A brilliant, high-hiding yellow pigment of good lightfastness and fastness to weathering is obtained.

EXAMPLE 8

The procedure described in Example 3 is followed, but instead of barbituric acid 82 parts of the sodium salt of N-methylbarbituric acid are used. 140 parts of a brilliant greenish yellow pigment having good dispersibility are obtained.

EXAMPLE 9

The procedure described in Example 8 is followed, but 76 parts of cyanoiminobarbituric acid are used. 137 parts of a reddish yellow pigment having a high tinctorial strength are obtained.

EXAMPLE 10

The procedure described in Example 3 is followed, but no fatty alcohol is used, and the batch is diluted with glycol instead of with isobutanol. The resulting suspension of the monocondensation product is acidified to pH 2 with sulfuric acid, 64 parts of barbituric acid are then added and the batch is diluted with just sufficient glycol to keep it stirrable. After stirring for a further half-hour at pH 2 and 60° C. the mixture is diluted with 700 parts of water and is then stirred for 1.5 hours at 60° C. followed by 10 hours at 130° C. 120 parts of a strongly greenish yellow high-hiding pigment having good lightfastness and fastness to weathering are obtained.

EXAMPLE 11

The procedure described in Example 1 is followed, but instead of cyanoacetamide 33 parts of malodinitrile are used. 120 parts of an easily dispersible neutral yellow pigment are obtained.

EXAMPLE 12

The procedure described in Example 1 is followed, but instead of cyanoacetamide 97 parts of p-chlorocyanoacetanilide are used. 150 parts of an easily dispersible orange pigment having good fastness characteristics are obtained.

EXAMPLE 13

The procedure described in Example 1 is followed, but instead of cyanoacetamide 93 parts of 2-cyanomethylquinazolone are used. 150 parts of a red pigment having good properties are obtained.

EXAMPLE 14

The procedure described in Example 1 is followed, but instead of cyanoacetamide 79 parts of 2-cyanomethylbenzimidazole are used. 150 parts of a yellowish red pigment are obtained.

We claim:

1. Easily dispersible pigment with high tinctorial strength, of the formula

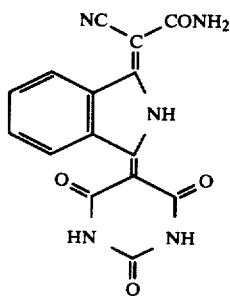

obtained by condensing 1-amino-3-imino-isoindoline with cyanoacetamide at pH >7 and then with barbituric acid at a pH of from 1.5 to 3.5 at from 20° to 150° C., wherein the condensation occurs in the presence of water or in water, and is carried out in the presence of from 5 to 400% by weight based on the barbituric acid, of a surfactant.

2. The pigment as claimed in claim 1, wherein the condensation is carried out in the presence of from 10 to 100% by weight, based on the barbituric acid, of a surfactant.

3. The pigment as claimed in claim 2, wherein the surfactant is a $C_4$–$C_{20}$-alkylbenzenesulfonic acid, a $C_4$–$C_{20}$-alkylphenolsulfonic acid, a mono- or bis- $C_4$–$C_{10}$-alkylnaphthalenesulfonic acid, a partially sulfonated polystyrene, a water-soluble condensation product of α-naphthalenesulfonic acid or $C_1$–$C_{10}$-alkylnaphthalenesulfonic acid and formaldehyde, a condensation product of a phenolsulfonic acid, formaldehyde and urea, a condensation product of phenol, urea, formaldehyde and sodium sulfite, a phenol-formaldehyde condensation product which has been post-condensed with phenol-sulfonic acid, urea and formaldehyde, a ligninsulfonate, a fatty acid of 12 to 20 carbon atoms, a resin acid or a mixture of two or more thereof in the form of an alkali metal salt, alkaline earth metal salt or ammonium salt, an adduct of ethylene oxide, or of ethylene oxide and propylene oxide, with an alkanol, alkanediol, alkanepolyol, wherein the alkane radicals are of 2 to 20 carbon atoms, phenol, carboxylic acid, carboxylic acid amide, or an aliphatic, cycloaliphatic or aromatic monoamine, diamine or polyamine, polyvinylpyridine, poly-N-methylpyrrolidone, polyvinyl alcohol, polyacrylic acid, polymethacrylic acid, a $C_{10}$–$C_{20}$-fatty alcohol or a condensation product of isobutyraldehyde with formaldehyde and urea, or a mixture of two or more of the said surface-active materials.

4. The pigment as claimed in claim 2, wherein the surfactant is a $C_1$–$C_5$-alkylnaphthalenesulfonic acid, a $C_{10}$–$C_{20}$-fatty alcohol, a condensation product of phenol, urea and formaldehyde, an adduct of ethylene oxide, or of ethylene oxide and propylene oxide, with a $C_2$–$C_{20}$-alkanol, $C_2$–$C_{20}$-alkanediol, a $C_3$–$C_{10}$-alkanetriol, an aliphatic $C_{10}$–$C_{20}$-carboxylic acid or a $C_{10}$–$C_{20}$-carboxylic acid amide, a condensation product of isobutyraldehyde, formaldehyde and urea, or a mixture of two or more of the said surface active materials.

5. The pigment as claimed in claim 2, wherein the condensation with the barbituric acid is carried out at from 60° to 90° C.

6. The pigment as claimed in claim 2, wherein the condensation with the barbituric acid is carried out at from 60° to 90° C. and, in order to complete the condensation, or after completion of the condensation, the reaction mixture is heated at from 110° to 140° C.

7. The pigment as claimed in claim 3, wherein the condensation with the barbituric acid is carried out at from 60° to 90° C.

8. The pigment as claimed in claim 3, wherein the condensation with the barbituric acid is carried out at from 60° to 90° C. and, in order to complete the condensation, or after completion of the condensation, the reaction mixture is heated at from 110° to 140° C.

9. The pigment as claimed in claim 4, wherein the condensation with the barbituric acid is carried out at from 60° to 90° C. and, in order to complete the condensation, or after completion of the condensation, the reaction mixture is heated at from 110° to 140° C.

10. A process for producing an easily dispersible pigment with high tinctorial strength, of the formula

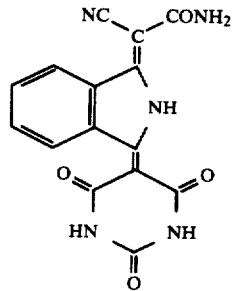

which comprises: first condensing 1-amino-3-iminoisoindoline with cyanoacetamide at pH>7, and then condensing the product obtained therefrom with barbituric acid at a pH of from 1.5 to 3.5 at from 20° to 150° C., wherein the condensation occurs in the presence of water or in water, and is carried out in the presence of from 5 to 400% by weight based on the barbituric acid, of a surfactant.

11. The process as claimed in claim 10, wherein the condensation is carried out in the presence of from 10 to 100% by weight, based on the barbituric acid, of a surfactant.

12. The process as claimed in claim 10, wherein the surfactant is a $C_4$–$C_{20}$-alkylbenzenesulfonic acid, a $C_4$–$C_{20}$-alkylphenolsulfonic acid, a mono- or bis- $C_4$–$C_{10}$-alkylnaphthalene-sulfonic acid, a partially sulfonated polystyrene, a water soluble condensation product of β-naphthalenesulfonic acid or $C_1$–$C_{10}$-alkylnaphthalenesulfonic acid and formaldehyde, a condensation product of a phenolsulfonic acid, formaldehyde and urea, a condensation product of phenol, urea, formaldehyde and sodium sulfite, a phenolformaldehyde condensation product which has been post-condensed with phenol-sulfonic acid, urea and formaldehyde, a ligninsulfonate, a fatty acid of 12 to 20 carbon atoms, a resin acid or a mixture of two or more thereof in the form of an alkali metal salt, alkaline earth metal salt or ammonium salt, and adduct of ethylene oxide, or of ethylene oxide and proplyene oxide, with an alkanol, alkanediol, alkanepolyol, wherein the alkane radicals are to 2 to 20 carbon atoms, phenol, carboxylic acid, carboxylic acid amide, or an aliphatic, cycloaliphatic or aromatic monoamine, diamine or polyamine, polyvinylpyridine, poly-N-methylpyrrolidone, polyvinyl alcohol, polyacrylic acid, polymethacrylic acid, a $C_{10}$–$C_{20}$-fatty alcohol or a condensation product of isobutyraldehyde with formaldehyde and urea, or a mixture of two or more of the said surface-active materials.

13. The process as claimed in claim 10, wherein the surfactant is a $C_1$–$C_5$-alkylnaphthalenesulfonic acid, a $C_{10}$–$C_{20}$-fatty alcohol, a condensation product of phenol, urea and formaldehyde, an adduct of ethylene oxide, or of ethylene oxide and propylene oxide, with a $C_2$–$C_{20}$-alkanol, a $C_2$–$C_{20}$-alkanediol, a $C_3$–$C_{10}$-alkanetriol, an aliphatic $C_{10}$–$C_{20}$-carboxylic acid or a $C_{10}$–$C_{20}$-carboxylic acid amide, a condensation product of isobutyraldehyde, formaldehyde and urea, or a mixture of two or more of the said surface active materials.

14. The process as claimed in claim 10, wherein the condensation with the barbituric acid is carried out at from 60° to 90° C.

15. The process as claimed in claim 10 or 11 wherein the condensation with the barbituric acid is carried out at from 60° to 90° C. and, in order to complete the condensation, or after completion of the condensation, the reaction mixture is heated at from 110° to 140° C.

16. The process as claimed in claim 12, wherein the condensation with the barbituric acid is carried out at from 60° to 90° C.

17. The process as claimed in claim 12, wherein the condensation with the barbituric acid is carried out at from 60° to 90° C. and, in order to complete the condensation, or after completion of the condensation, the mixture is heated at from 110° to 140° C.

18. The process as claimed in claim 13, wherein the condensation with the barbituric acid is carried out at from 60° to 90° C. and, in order to complete the condensation, or after completion of the condensation, the reaction mixture is heated at from 110° to 140° C.

* * * * *